United States Patent [19]

Battaglia

[11] Patent Number: 5,590,589
[45] Date of Patent: Jan. 7, 1997

[54] APPARATUS FOR PRODUCING SPECIALTY RAVIOLI CONFIGURATIONS

[76] Inventor: John Battaglia, 78 McKinley St., Hackensack, N.J. 07601

[21] Appl. No.: 583,681

[22] Filed: Jan. 5, 1996

[51] Int. Cl.⁶ .................. A21C 9/00; A23P 1/00
[52] U.S. Cl. .......... 99/450.7; 99/450.2; 99/450.6; 425/112; 425/115
[58] Field of Search .................. 99/450.1–450.8, 99/494, 485; 425/112, 115, 122, 448, 511, 512, 515, 518, 327, 362

[56] References Cited

U.S. PATENT DOCUMENTS

| | | | |
|---|---|---|---|
| 1,844,142 | 2/1931 | Barili | 99/450.2 |
| 2,001,792 | 5/1935 | Lombi | 99/450.2 |
| 2,227,728 | 1/1941 | Lombi | 99/450.2 |
| 2,774,313 | 12/1956 | Lombi | 99/450.2 |
| 2,905,105 | 9/1959 | Lombi | 99/450.6 |
| 3,373,702 | 3/1968 | Quilici et al. | 99/450.5 |
| 3,605,641 | 9/1971 | Shuster | 99/450.7 |
| 3,930,441 | 1/1976 | Ohkawa | 425/223 X |
| 4,160,634 | 7/1979 | Huang | 99/450.6 |
| 4,848,218 | 7/1989 | Battaglia | 99/450.7 |
| 4,941,402 | 7/1990 | D'Alterio | 99/450.6 |
| 5,010,807 | 4/1991 | Anderson et al. | 99/450.6 |
| 5,205,209 | 4/1993 | Tansini | 99/450.6 |

Primary Examiner—Timothy F. Simone

[57] ABSTRACT

An apparatus for producing specialty ravioli configurations such as hoop style ravioli comprises an apparatus similar to that disclosed in U.S. Pat. No. 4,848,218 having a unique die and feed arrangement. The die includes a raised central island in a walled recess which engages a continuous dough sheet to create an aperture in a hoop-shaped ravioli or alternatively the die may have a design at the base of the raised island which would appear within the center of the raised hoop-shaped ravioli. A plurality of apertures are positioned about the island on the base of the die to prevent a vacuum when the filler material is fed into the formed sheet material by dual pivoting nozzles which insure complete filling of the unique ravioli.

4 Claims, 4 Drawing Sheets

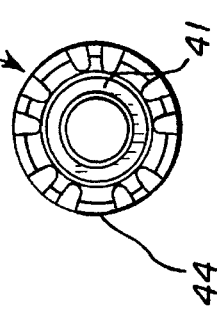
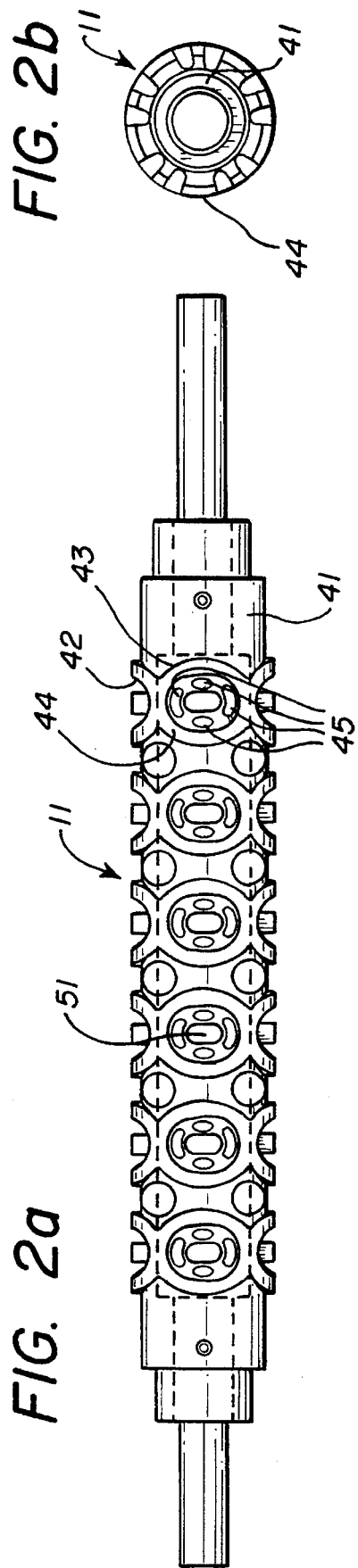
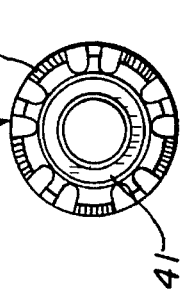
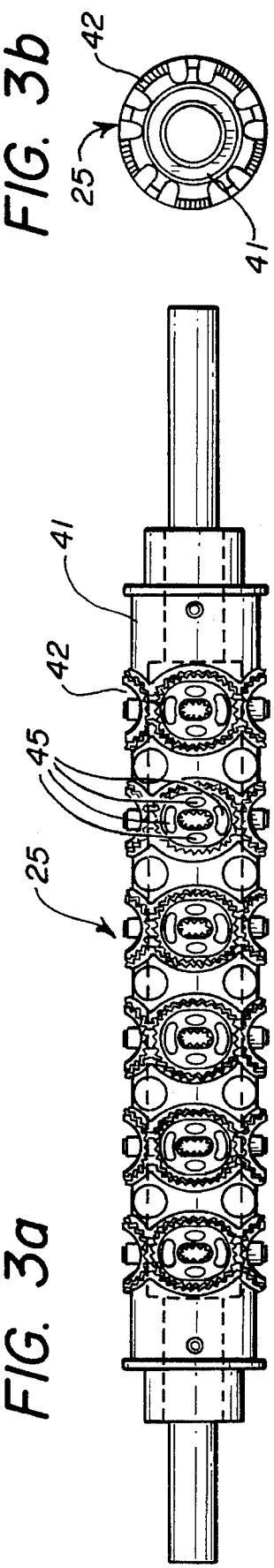

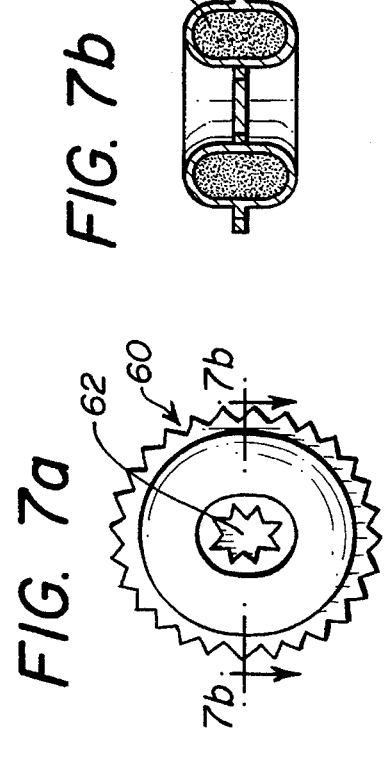
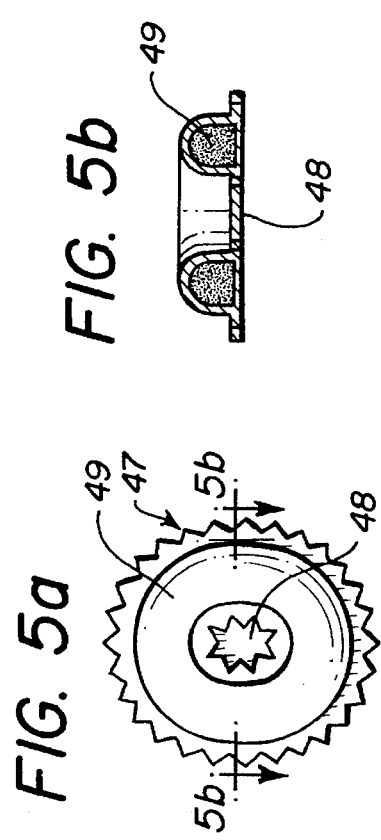
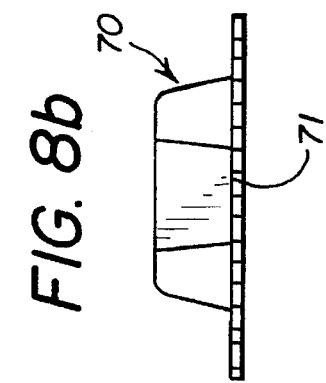
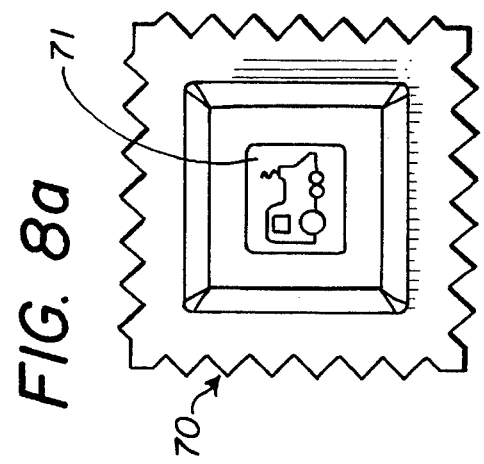
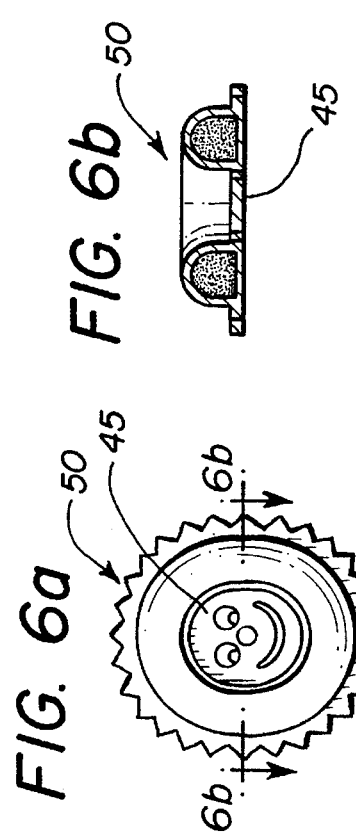

5,590,589

1

APPARATUS FOR PRODUCING SPECIALTY RAVIOLI CONFIGURATIONS

BACKGROUND OF THE INVENTION

This invention relates to apparatus for producing ravioli and particularly to an apparatus for mass producing unique specialty ravioli configurations such as hoop style ravioli or related design configurations.

The prior art includes machines for automatically forming pastry such as U.S. Pat. No. 3,930,441 and pie or ravioli filling apparatus such as U.S. Pat. Nos. 1,844,142, 2,001,792 and 2,774,313 to Lombi which disclose a somewhat more relevant apparat ravioli manufacturing. Applicant's U.S. Pat. No. 4,848,218 discloses a machine for making ravioli and an improved fill mechanism which is basically the standard for the industry. This application represents a unique and improved apparatus wherein a new die and fill mechanism is provided to produce specialty ravioli in conjunction with the mechanism shown in applicant's previously cited patent. The invention is not limited to hoop style raviolis but may also be used to produce hoop shaped ravioli having a centrally located recessed design and pockets filled on one or both sides of the central sheet.

The prior art is concerned with standard ravioli configurations and the teachings are limited thereto in the techniques and machines employed. This invention represents an improvement over prior art apparatus by providing an apparatus having distinct features to produce a unique product.

SUMMARY OF THE INVENTION

This invention relates to an apparatus for producing specialty ravioli configurations such as hoop or donut style ravioli. The apparatus includes a roller die having a plurality of repetitive configurations thereon to configure a sheet of dough as it is fed between the die and a meshing forming die. Each die configuration includes an outer wall, a recessed portion and a raised island to provide the aperture in the "hoop" and a plurality of cavities positioned in the recess about the island to prevent a vacuum during the feed of filler material. Each die configuration is fed filler material by a pair of spaced pivoting nozzles which insure that the filler material is spread on both sides of the island. The combination of these unique features is necessary to produce specialty ravioli on a mass production basis.

Accordingly, an object of this invention is to provide a new and improved apparatus for producing specialty ravioli.

Another object of this invention is to provide a new and improved apparatus for producing hoop style ravioli with a unique die arrangement.

A further object of this invention is to provide a new and improved apparatus for producing special configured ravioli including a novel feed arrangement for the filler material.

A more specific object of this invention is to provide a new and improved apparatus for producing specialty hoop style configured ravioli with a unique shaping die and a unique feeding arrangement for the filler material involving dual spaced pivoting nozzles.

DESCRIPTION OF THE DRAWINGS

The above and other objects of the invention may be more clearly seen when viewed accordance with the accompanying drawings wherein:

2

Figure 1:
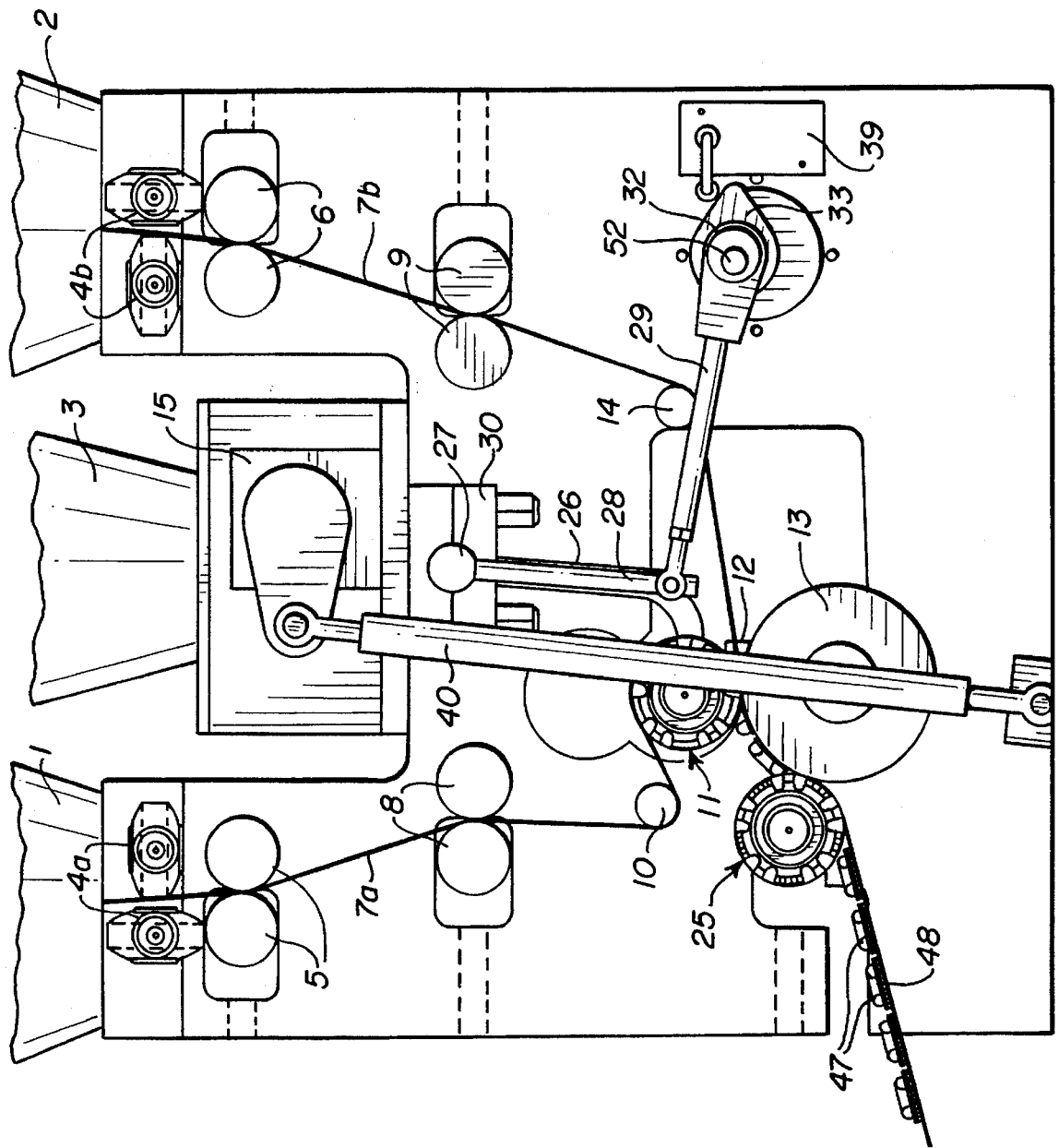
Figure 4B:
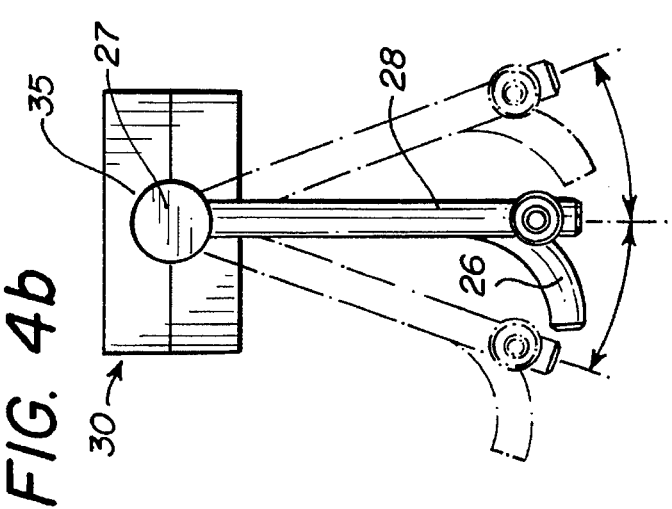
Figure 4C:
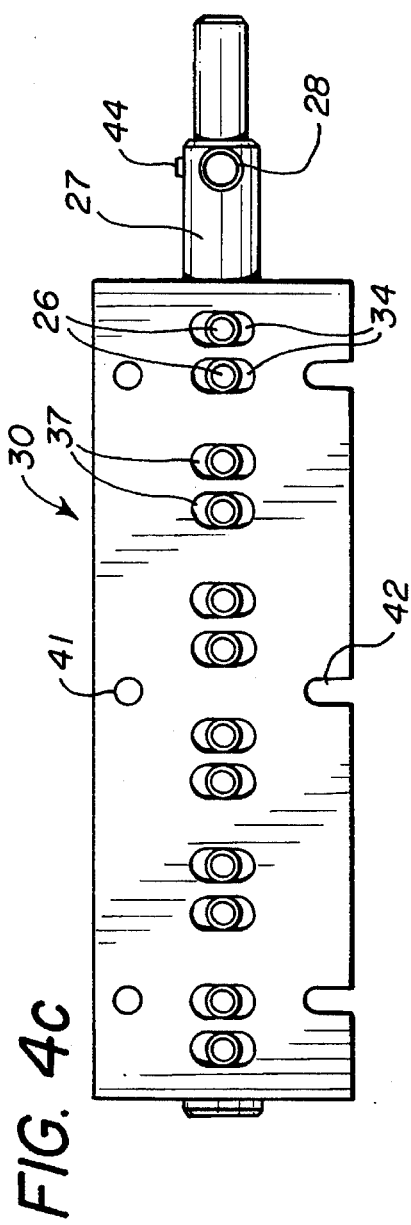
Figure 4A:
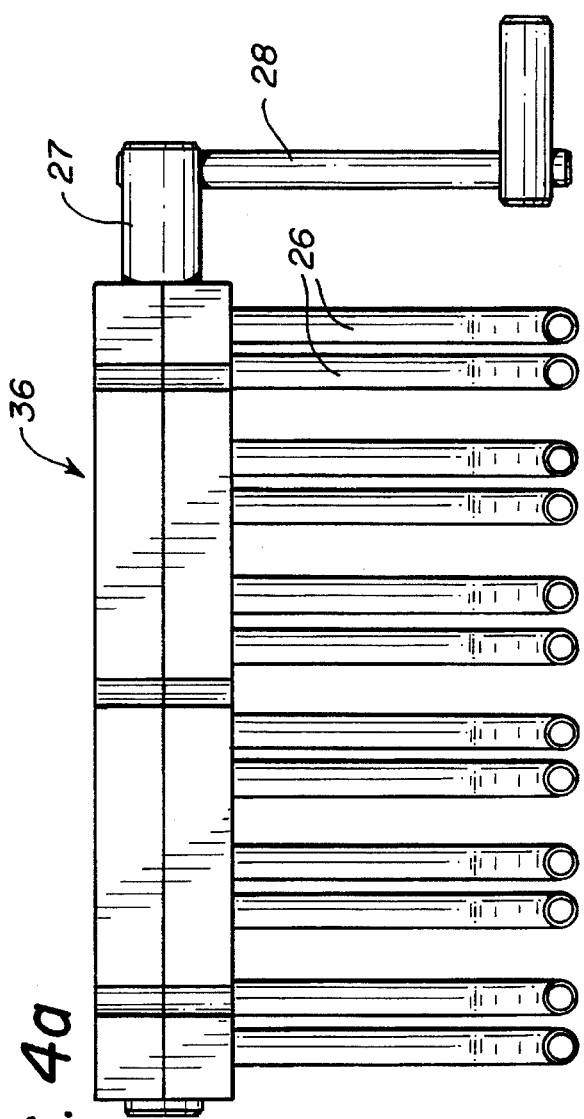

FIG. 1 discloses the ravioli machine of this invention with its unique forming features;

FIG. 2a discloses the primary forming die used to produce specialty configured ravioli and FIG. 2b is an end view of said die;

FIG. 3a is an front view of the secondary cutting die and FIG. 3b is an end view of said die;

FIG. 4a discloses a front view of the feed tube arrangement utilized in connection with the die; FIG. 4b is a top view of the feed tube, and FIG. 4c is a side view with the pivoting motion shown in phantom;

FIG. 5a shows a hoop type ravioli with sectional view 5b illustrating the filling pocket on the top side only;

FIG. 6a shows a specialty ravioli with a central design in the center of a ravioli and the filling pocket on the top side only with FIG. 6b illustrating a view along the line 6—6 of FIG. 6a;

FIG. 7a shows a view of the ravioli with the filling pocket on both sides and FIG. 7b illustrates a cross-sectional view along the line 7—7 of FIG. 7a; and FIG. 8a shows a top view of a different shaped ravioli with a center pattern filled on the top side only and FIG. 8b shows a side view of the ravioli.

DETAILED DESCRIPTION OF THE INVENTION

Referring now to FIG. 1 of the drawings, the invention includes a ravioli making machine which has been manufactured by MPC Food Machinery Corporation of Hackensack, N.J. and is shown in U.S. Pat. No. 4,848,218. The machine has been adapted for making hoop style ravioli and other specialty ravioli as shown in FIGS. 5–8 by utilizing a new die and feed arrangement.

The ravioli machine comprises two dough hoppers 1 and 2 with a filler material hopper 3 located therebetween. Chunks of unformed dough are fed through kneader bars 4a and 4b, then through a pair of primary forming rolls 5 and 6 which rough form the dough into sheets 7a and 7b. The sheets 7a, 7b proceed through secondary forming rolls 8 and 9 which size the sheets 7a, 7b to the proper thickness. The dough sheet 7a from hopper 1 is fed around a tension idler 10 over the top of the female die roll 11 and around the die roll 11 downwardly to a nip 12 formed by this female die roll 11 and a drum roll 13 which cooperates therewith. The dough sheet 7b from dough hopper 2 is simultaneously fed through the secondary forming rolls 9, around tension idler 14 and into the nip 12 where the dough sheet 7b is combined with the filler material 49 and the upper sheet 7a. The cutter 25 segments the sheets into individual ravioli 47.

A gear pump 15 is located at the outlet of the filler material hopper to intermittently feed filler material to a feed tube 26. The feed tube 26, as shown in FIG. 4 is rotatably mounted on a journal 27. Referring now to FIG. 1, the journal 27 can be turned by means of pivot rod 28. However since the motion of the pivot rods 28 is limited by cam follower rod 29, the motion of the journal 27 is limited to a back and forth oscillating motion. The mounting block, 30 includes with a support bearing surface, 31 in which the journal 27 moves.

The follower rod 29 rides on cam 32, which causes an oscillating motion of the follower rod 29, which is transmitted to the journal 27, through the pivot rod 28. Since, both cam 32 and cam 33 are mounted on the same shaft 52, the cams 32, 33 can be adjusted with respect to one another so as to coordinate the positioning of the feed tubes 26, and the activation of the gear pump 15. The gear pump 15 is actuated by means of an air motor (not shown), the motor being energized by the tripping of switch 39 by a cam 33. The gear pump 15 is driven by means of push rod 40 which is connected to the air motor.

Referring now to FIG. 4a–c, details of the feed mechanism are shown wherein the mechanism comprises a multiplicity of paired feed tubes 26. Two feed tubes 26 are provided for each die configuration on die 11 so that the opposite sides of the center island 51 may be properly filled. The pivoting action of the feed tubes is illustrated in phantom in FIG. 4b. FIG. 4c shows the elliptical openings 34 which restrict the movement of the feed tubes 26.

The journal 27 is provided with twelve feed ports 34 to accept feed tubes 26 which are secured by set screws, 43. A hole 35 located at one end of the journal 27 accepts the pivot rod 28, which drives the journal 27. The pivot rod 28, is secured to the journal by means of a set screw 44. The mounting block 30 comprises two halves which are mirror images of one another. Each half has a molded in bearing surface to support the journal 27. The elliptical holes 34 in the bottom half of the block 30a permit the feed tubes 26 to pass through and oscillate to the required extent without obstructing the motion of the feed tube 26. Filler material is fed through elliptical holes (not shown), located in the top half of the block 30 to the tubes 26. The block 30 is held together by bolts passing through holes 41 and slots 42 which simultaneously secure the block 30 to the machine frame in juxtaposition with the gear pump 15.

The combination of horizontal side feeding of filler material on both sides of the center island 51 and withdrawal of the feed tubes 26 from the die roll area after filler material discharge results in a high speed dripless fill operation. The use of Delrin® as the material of construction for the mounting block 30, and the journal 27 eliminates both the need for potentially food contaminating lubrication and the possibility of metal particles entering the food being processed.

As noted herein, the pivoting feed tubes 26 are clustered in pairs so that each side of the die 11 on opposite sides of the island 51 are properly filed. The die 11 as shown in FIGS. 2 and 3, comprises a roller 41 having a plurality of forms 42 located axially therealong in a repeating sequence involving the entire roller 41. A typical roller 41 would have the forms 42 to produce six ravioli simultaneously. Each form 42 includes a raised outer wall portion 43 and a raised inner wall portion 44. Located between the inner wall portion 44 and the raised island 51 are four apertures 45 designed to eliminate a vacuum when the filler material is fed thereto by the pivoting feed tubes 26. The die 11 engages a roller 46 which results in the formation of hoop ravioli 47 with a central aperture 48 surrounded by a filled portion 49 as shown in FIG. 5a or decorative ravioli 50 with a central design 45 as shown in FIG. 6a. The later ravioli 50 would include a design portion on the die 11 which would be impressed on the central portion 49 of the ravioli 50. FIG. 7a show a ravioli 60 with the pocket 61 filled on both sides and a central aperture 62. FIG. 8a shows a polygonal shaped ravioli 70 with a substantially rectangular design 71 impressed thereon.

With the invention it is thus possible to adapt existing machines to produce new types of ravioli. The market for the product should be enhanced by the development of such varieties of ravioli such-as hoop-shaped or other specialty ravioli.

While the invention has been explained by a detailed description of certain specific embodiments, it is understood that various modifications and substitutions can be made in any of them within the scope of the appended claims which are intended also to include equivalents of such embodiments.

What is claimed, is:

1. An apparatus for making specialty ravioli comprising:
   a filler material hopper and a pair of dough hoppers located one on each side of the filler hopper;
   means for sheeting dough exiting from each dough hopper;
   a female die-roll having a plurality of molds for forming the hoop-style ravioli, each mold comprising a raised outer wall, a base portion extending therefrom and a raised inner wall at the end of the base portion forming a raised island;
   a drum roll in juxtaposition with the die roll and spacially oriented to be displaced vertically from the die roll;
   means feeding a first dough sheet into a nip formed by the die roll and the drum roll, said first dough sheet being fed into the nip after passing over the die roll to form an oval dough lined cavity with a central aperture;
   fill means for feed a filler material from the filler hopper into the dough lined cavity formed in the die roll, said means comprising a paired feed tube arrangement which pivots into the die on both sides of each raised island; and,
   means for feeding a second dough sheet into the nip to seal the first and second dough sheets together by passing the sheets through the nip.

2. An apparatus for making specialty ravioli in accordance with claim 1 wherein;
   the base portion of the female die roll includes a plurality of aperture to prevent a vacuum and improper filling during feeding.

3. An apparatus for making specialty ravioli in accordance with claim 1 wherein:
   the raised island includes a recessed center portion having a design configuration to be impressed on the center of each ravioli by an oval raised filled portion.

4. An apparatus for making specialty ravioli in accordance with claim 1 further including:
   feeding means; and,
   a second female die cooperating with the first female die to provide a ravioli having a pocket on both sides of the second dough sheet.

\* \* \* \* \*